No. 620,181. Patented Feb. 28, 1899.
J. E. RICKLEFS.
GRAIN DRILL.
(Application filed Apr. 22, 1898.)

(No Model.)

Witnesses:
M. R. Remley.
F. S. Thrasher.

Inventor:
John E. Ricklefs
By Higdon, Fischer & Thorpe
Attys.

UNITED STATES PATENT OFFICE.

JOHN E. RICKLEFS, OF TROY, KANSAS.

GRAIN-DRILL.

SPECIFICATION forming part of Letters Patent No. 620,181, dated February 28, 1899.

Application filed April 22, 1898. Serial No. 678,455. (No model.)

*To all whom it may concern:*

Be it known that I, JOHN E. RICKLEFS, of Troy, Doniphan county, Kansas, have invented certain new and useful Improvements in Grain or Seed Drills, of which the following is a specification.

My invention relates to grain or seed drills; and it consists in certain novel and peculiar features of construction and combinations of parts, as will be hereinafter described and claimed.

The object of the invention is to produce a seed-drill whereby the seed may be planted at a greater depth than the drills plant that are in common use, to the end that there will be no danger of the seed freezing in cold weather or drying out in hot weather.

A further object of the invention is to produce a seed-drill having rollers for covering the seed and means whereby said rollers shall be held down to their work with a yielding pressure, though permitted an independent adjustment to accommodate themselves to stones or other hard obstructions in the field.

In order that the invention may be fully understood, reference is to be had to the accompanying drawings, in which—

Figure 1:
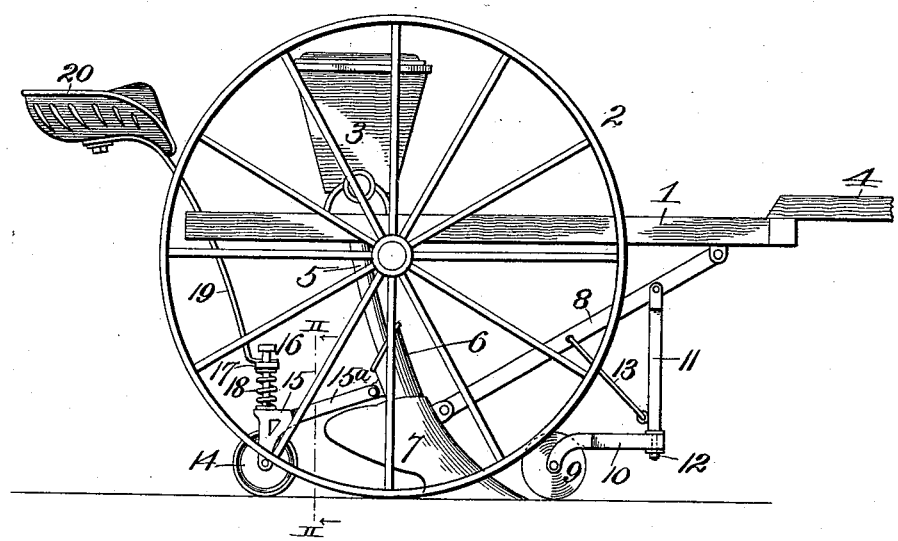
Figure 2:
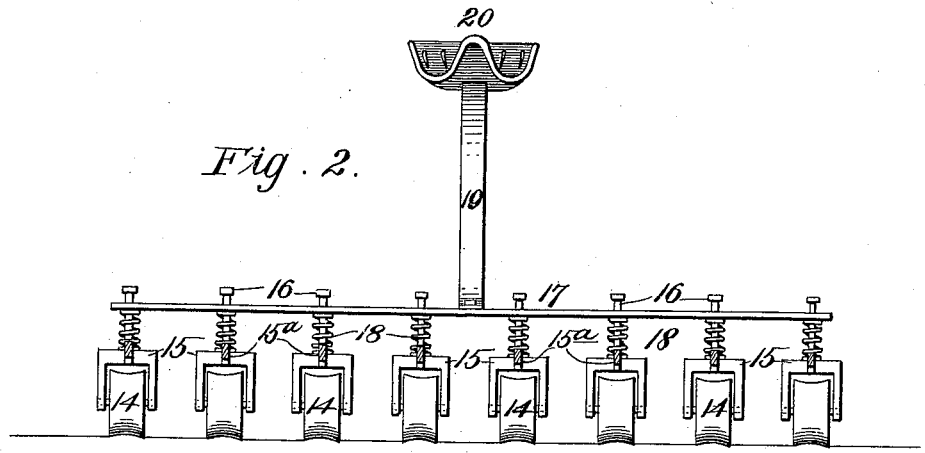
Figure 3:
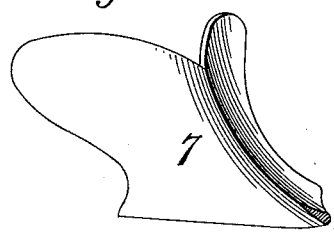

Figure 1 represents in side elevation a seed-drill embodying my invention. Fig. 2 represents a vertical section taken on the line II II of Fig. 1. Fig. 3 represents a perspective view of the plow for turning a furrow of the required depth.

In the said drawings, 1 designates a framework; 2, the wheels; 3, the seedbox; 4, the tongue; 5, the seed-spouts; 6, the boots of the customary type of seed or grain drills, and 7 designates lister-plows, which make comparatively deep furrows and turn or deflect the loose earth to both sides of the same. These plows are secured to the boots by means of rivets, bolts, or their equivalents (not shown) and embrace the boots substantially as shown, so that the grain or seed shall drop in the center of the furrows turned by the plows.

8 designates braces which are connected at their opposite ends to the plows and to the frame 1.

9 designates colters or sod-cutting wheels arranged just in advance of the points of the plows, and 10 bars or brackets in which the colters are journaled. Said bars or brackets are secured to the lower ends of the vertical bars by means of clamp-nuts 12, and said bars 11 are bolted at their upper ends to braces 8. To maintain bars 11 in a vertical position, brace-rods 13 are connected at their opposite ends to said bars and braces 8.

14 designates covering-rollers equal in number to the lister-plows employed and arranged in longitudinal alinement with the same, so as to reliably cover the seed. Said rollers are journaled in brackets 15, and said brackets are pivotally connected by forwardly-extending arms $15^a$ to the boots 6, as shown clearly in Fig. 1.

16 designates a series of vertical headed rods which project upwardly from the brackets 15, and 17 a cross-bar slidingly mounted upon said rods and resting upon the spiral expansion-springs 18, said springs encircling rods 16 and resting upon said brackets.

19 designates a standard which is secured at its lower end to the center of rod 17 and carries at its upper end a seat 20 in order that the weight of the driver may be utilized to hold the rollers down upon the ground with a firm pressure, and consequently insure the covering of the seed.

By distributing the weight of the rider upon a plurality of springs they are not completely compressed, and consequently are in condition for further compression, if one or more of the rollers should happen to strike a rock or other unyielding surface, to the end that no injury to the machine shall result.

From the above description it will be apparent that the employment of a lister-plow is a reliable guaranty that the seed shall be planted at a suitable depth—that is, at a greater depth than is customary—and that the employment of a gang of covering-rollers each having independent vertical adjustment and yet all held down with a yielding and uniform pressure makes the seed-covering operation reliable and at the same time obviates chance of injury to the machine.

From the above description it will be apparent that I have produced a grain or seed drill which embodies the features of advantage enumerated in the statement of invention and which is simple, strong, durable, and cheap of manufacture, and it is to be understood, of course, that changes in the form, proportion, organization, or detail construction, or the substitution of equivalents will not be considered a departure from the spirit and scope of the invention.

Having thus described the invention, what I claim as new, and desire to secure by Letters Patent, is—

In a grain-drill, the combination of a wheeled frame provided with a seedbox and grain-dropping devices, comprising a spout 5 and a boot 6 upon the spout, a plow 7 upon the boot, a brace connecting the plow and the frame, a cutting-wheel supported from said brace, a covering-wheel rearward of the plow, an inverted-U-shaped bracket in which said wheel is journaled, and provided with a forwardly-projecting arm $15^a$ pivoted to the boot, and an upwardly-projecting headed arm 16, a horizontal bar fitting loosely on said arm 16, a spiral expansive spring 18 upon said arm 16 and interposed between the bridge portion of the bracket and said horizontal bar, and a seat supported from said bar, substantially as described.

In testimony whereof I affix my signature in the presence of two witnesses.

JOHN E. RICKLEFS.

Witnesses:
G. E. HATHWAY,
G. A. HANTZERNADER.